US007920630B2

(12) United States Patent
Bhatia et al.

(10) Patent No.: US 7,920,630 B2
(45) Date of Patent: Apr. 5, 2011

(54) BUFFER DESCRIPTOR DATA STRUCTURE FOR COMMUNICATION LINK BETWEEN DECODE AND DISPLAY PROCESSES IN MPEG DECODERS

(75) Inventors: Sandeep Bhatia, Bangalore (IN); Santosh Savekar, Bangalore (IN); Srinivasa Reddy, Karnataka (IN); Subramanian Kuppuswamy, Bangalore (IN); Shivapirakasan Kanakaraj, Karnataka (IN); Satheesh Babu, Karnataka (IN); Arun Gopalakrishna Rao, Karnataka (IN); Gaurav Agrawal, Karnataka (IN); Sunoj Koshy, Karnataka (IN)

(73) Assignee: Broadcom Corporation, Irvine, CA (US)

( * ) Notice: Subject to any disclaimer, the term of this patent is extended or adjusted under 35 U.S.C. 154(b) by 982 days.

(21) Appl. No.: 10/606,478

(22) Filed: Jun. 26, 2003

(65) Prior Publication Data

US 2004/0141553 A1    Jul. 22, 2004

Related U.S. Application Data

(60) Provisional application No. 60/441,820, filed on Jan. 21, 2003.

(51) Int. Cl.
   *H04N 7/18* (2006.01)

(52) U.S. Cl. .............................. 375/240.25; 375/240.26

(58) Field of Classification Search ........... 375/240.01–240.29; 345/619; 709/231; 386/68; *H04N 7/12*
See application file for complete search history.

(56) References Cited

U.S. PATENT DOCUMENTS

| 5,625,410 | A | * | 4/1997 | Washino et al. | 348/154 |
| 5,983,022 | A | * | 11/1999 | Watkins et al. | 709/231 |
| 6,014,694 | A | * | 1/2000 | Aharoni et al. | 709/219 |
| 6,122,433 | A | * | 9/2000 | McLaren | 386/68 |
| 6,252,873 | B1 | * | 6/2001 | Vines | 370/389 |
| 6,437,787 | B1 | * | 8/2002 | Wu | 345/519 |
| 7,218,676 | B2 | * | 5/2007 | Kono et al. | 375/240.25 |
| 2005/0093885 | A1 | * | 5/2005 | Savekar et al. | 345/619 |
| 2006/0193383 | A1 | * | 8/2006 | Alvarez et al. | 375/240.23 |

* cited by examiner

*Primary Examiner* — Andy S Rao
(74) *Attorney, Agent, or Firm* — McAndrews, Held & Malloy, Ltd.

(57) ABSTRACT

A system, method, and apparatus for providing display parameters from the decode process to the display process are presented herein. The decode process receives images which are encoded according to a predetermined standard. Included with the encoded images are parameters which facilitate the decode and display processes. The decode process decodes the encoded images as well as the parameters and stores each image in a separate image buffer. Additionally, the decode process stores the parameters which facilitate the display process in a buffer descriptor structure associated with the image buffer. The display process uses the parameters stored in the buffer descriptor structure during the display process.

20 Claims, 5 Drawing Sheets

BUFFER DESCRIPTOR DATA STRUCTURE FOR COMMUNICATION LINK BETWEEN DECODE AND DISPLAY PROCESSES IN MPEG DECODERS

RELATED APPLICATIONS

This application claims priority to Provisional Application for U.S. Patent, App. Ser. No. 60/441,820, filed Jan. 21, 2003 by Sandeep Bhatia, entitled "Buffer Descriptor Data Structures for Communication Link between Decode and Display Processes in MPEG Decoders", which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This application is related to digital video data, and more particularly to buffer descriptor data structures between the decode and display processes in a decoder.

Video decoders decode a video bit-stream encoded according to a predetermined standard syntax, such as MPEG-2 or Advanced Video Compression (AVC). An encoder generating a compressed video bit-stream makes a number of choices for converting the video stream into a compressed video bit-stream that satisfies the quality of service and bit-rate requirements of a channel and media. However, decoders have limited choices while decoding the compressed bit stream. The decoder uses the decisions made by the encoder to decode and present pictures at the output screen with the correct frame rate at the correct times, and the correct spatial resolution.

Decoding can be partitioned in two processes—the decode process and the display process. The decode process parses through the incoming bit stream and decodes the bit stream to produce decode images which contain raw pixel data. The display process displays the decoded images onto an output screen at the proper time and at the correct and appropriate spatial and temporal resolutions as indicated in the display parameters received with the stream.

Some encoders, such as MPEG encoders, encode the time at which each decoded image is to be presented along with the compressed pixel data for the image. The spatial resolution of a picture, such as horizontal size and vertical size is also encoded along with the compressed pixel data of a picture. At the start of every sequence, the frame rate (temporal resolution) at which encoded images in the sequence are to be output onto the screen is indicated in the compressed bit stream. The decode process parses all of the foregoing parameters while decoding the compressed bit stream. While some of the information parsed during the decode process, such as horizontal and vertical picture sizes, are important only for the decode process, other parameters such as the presentation time and aspect ratio of the picture are to be used exclusively while displaying the picture. For example, MPEG-2 uses presentation time stamps to indicate the presentation time for an image on the display. In order for the display process to accomplish its objective of being able to present image buffers at their correct intended presentation time, the display process uses various parameters, including the presentation time stamp, parsed during the decode process. In some standards, such as MPEG-2 and AVC, the number of parameters can be quite large. Additionally, the decode process is also responsible for altering the configuration of the display hardware Alternatively, decode process is also responsible for detecting if a reconfiguration of display hardware will be necessary and making necessary preparations for it. if the display parameters such as displayable horizontal and vertical size, aspect ratio change before the pictures with changed parameters are processed by the display hardware.

Further limitations and disadvantages of conventional and traditional approaches will become apparent to one of skill in the art through comparison of such systems with embodiments presented in the remainder of the present application with reference to the drawings.

BRIEF SUMMARY OF THE INVENTION

A system, method, and apparatus for providing display parameters from the decode process to the display process are presented herein. The decode process receives images which are encoded according to a predetermined standard. Included with the encoded images are parameters which facilitate the decode and display processes. The decode process decodes the encoded images as well as the parameters and stores each image in a separate image buffer. Additionally, the decode process stores the parameters which facilitate the display process in a buffer descriptor structure associated with the image buffer. The display process uses the parameters stored in the buffer descriptor structure during the display process.

These and other advantages and novel features of the embodiments in the present application will be more fully understood from the following description and in connection with the drawings.

DETAILED DESCRIPTION OF THE INVENTION

Figure 1:
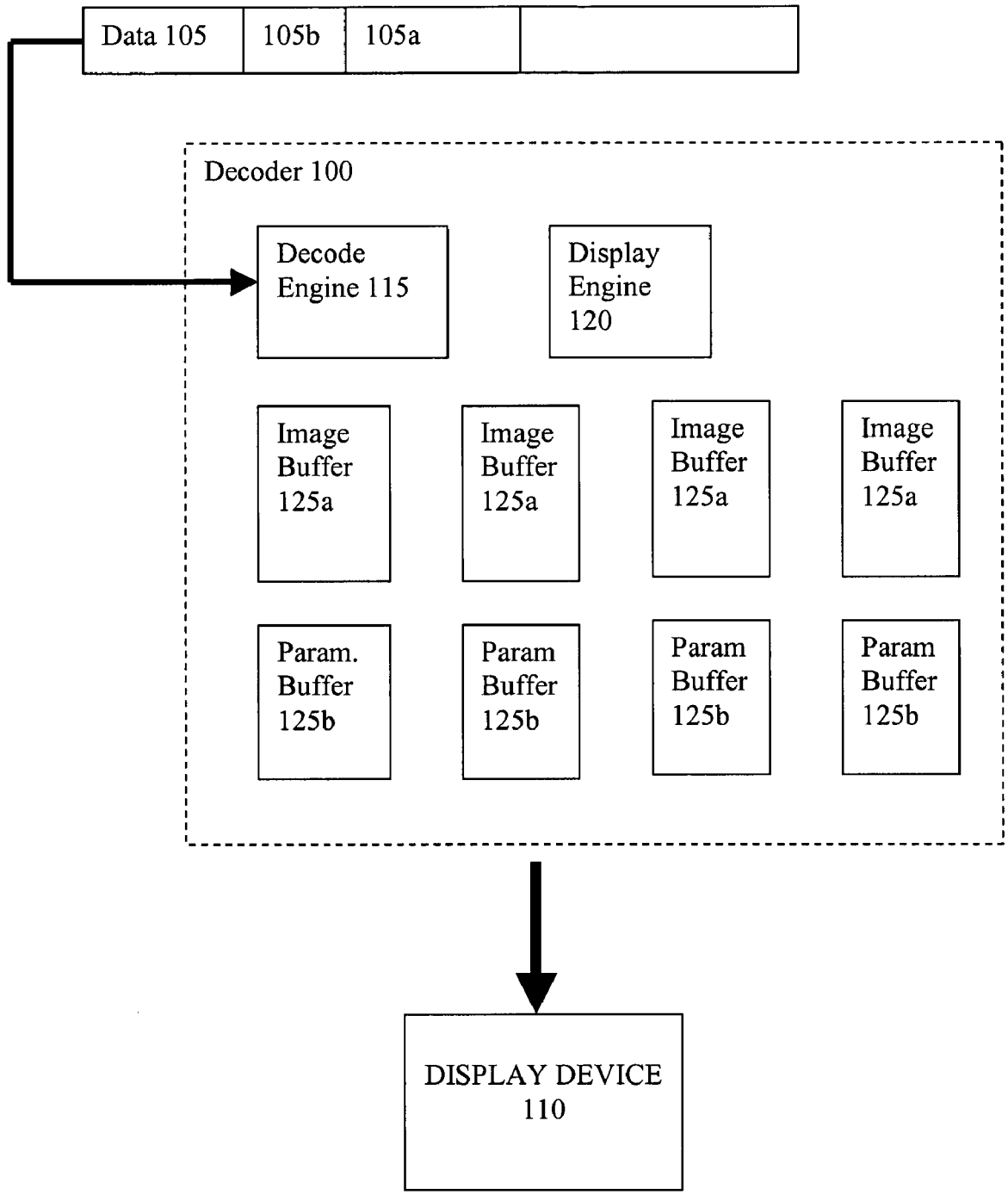
FIG. 1 is a flow diagram describing a decode and display process in accordance with an embodiment of the present invention.

Referring now to FIG. 1, there is illustrated a block diagram of an exemplary decoder 100 for displaying images. The decoder receives encoded data 105 that includes encoded images 105a and associated parameters 105b and displays the images on the display device 110. An encoder encodes the images according to a predetermined standard. The predetermined standard can include, for example, but is not limited to, MPEG, MPEG-2, or AVC. The encoder also encodes a number of parameters for each image that facilitate the decoding and displaying process. These parameters can include, for example, the decode time, presentation time, horizontal size, vertical size, or the frame rate. The encoder makes a number of choices for encoding the images and parameters in a manner that satisfies the quality requirements and channel characteristics. However, the decoder 100 has limited choices while decoding and displaying the images. The decoder 100 uses the decisions made by the encoder to decode and display pictures with the correct frame rate at the correct times, and the correct spatial resolution.

The decoder can be functionally partitioned into two sections—a decode engine 115 and a display engine 120. The decode engine 115 decodes the encoded images and parameters and generates decoded images. Decoding by the decode engine 115 can also include decompressing compressed images, wherein the images are compressed. The decoded images include the raw pixel data. Additionally, the decode engine 115 decodes the parameters associated with the images. The display engine 120 takes care of displaying the decoded images onto the display device 110 at the proper time and at the correct spatial and temporal resolution.

The display engine 120 lags behind the decode engine 115 by a delay time. In some cases, the delay time is not constant. For example, in MPEG-2 and AVC, the order the images are decoded and the order the images are displayed are not necessarily the same. Where the display engine 120 lags behind the decode engine 115, the decoded images are buffered in image buffers 125a for display by the display engine 120. In order for the display engine 120 to accomplish its objective of being able to present the decoded images at their correct intended presentation time, the display engine 120 needs various parameters decoded by the decode engine. Accordingly, the decode engine 115 stores the parameters needed for displaying the images in a data structure 125b. There is a one to one correspondence between data structures 125a and 125b. The display engine 120 retrieves the parameters needed for displaying the images on the display device 110 and displays the images on the display device 110 based on the parameters.

Figure 2:
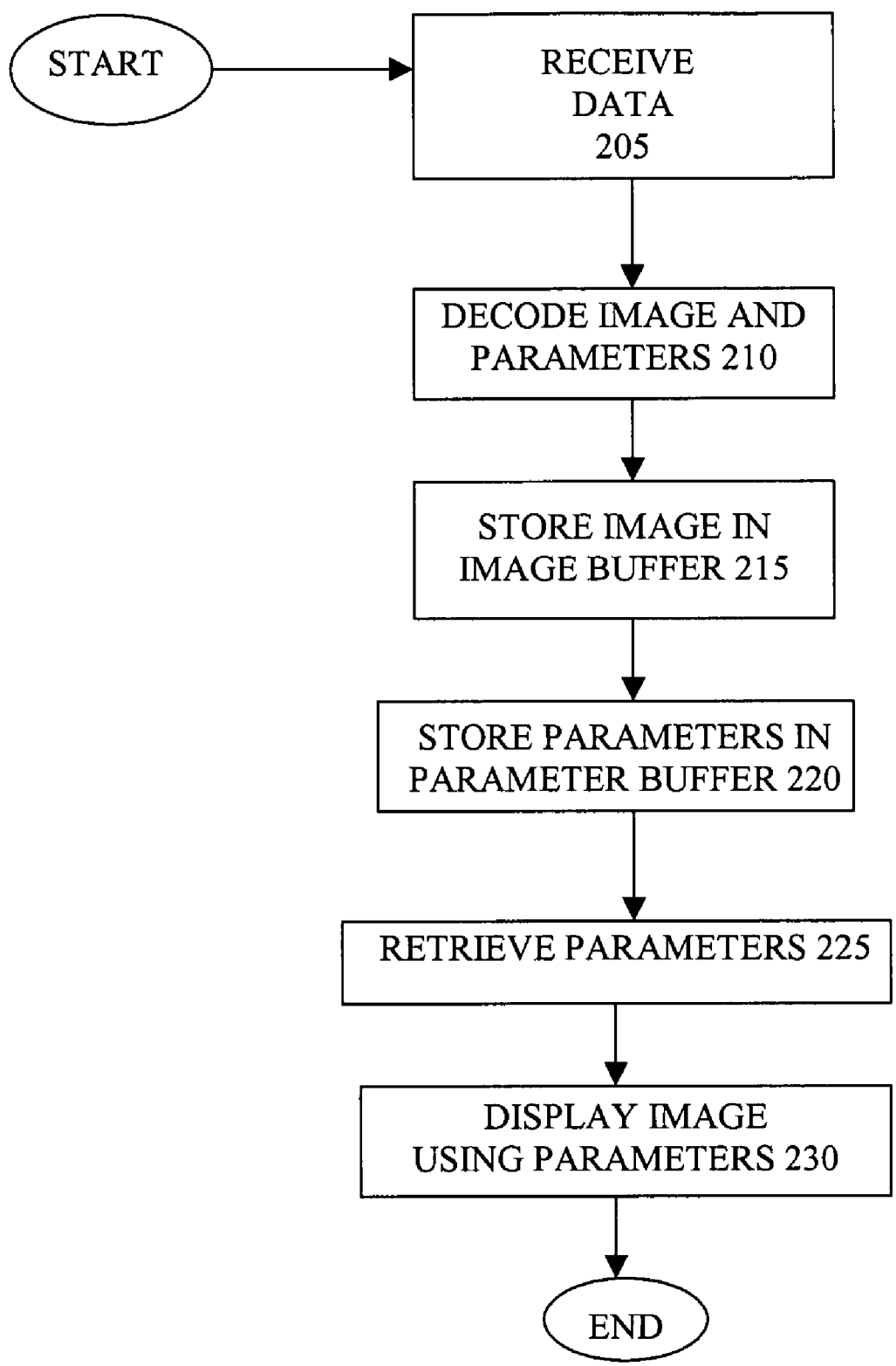
FIG. 2 is a block diagram describing an exemplary decoder system for decoding and displaying images.

Referring now to FIG. 2, there is illustrated a flow diagram describing the decoding and displaying of an image in accordance with an embodiment of the present invention. At 205, data comprising encoded images and encoded parameters is received by a decode engine. At 210, the decode engine decodes the image and parameters. The decoded image is buffered in an image buffer (at 215) and the parameters are stored in a parameter buffer (at 220) associated with the image buffer. At 225, the display engine retrieves the parameters stored in the buffer. The display engine uses the parameters retrieved during 225 to display the decoded image (230).

Figure 3:
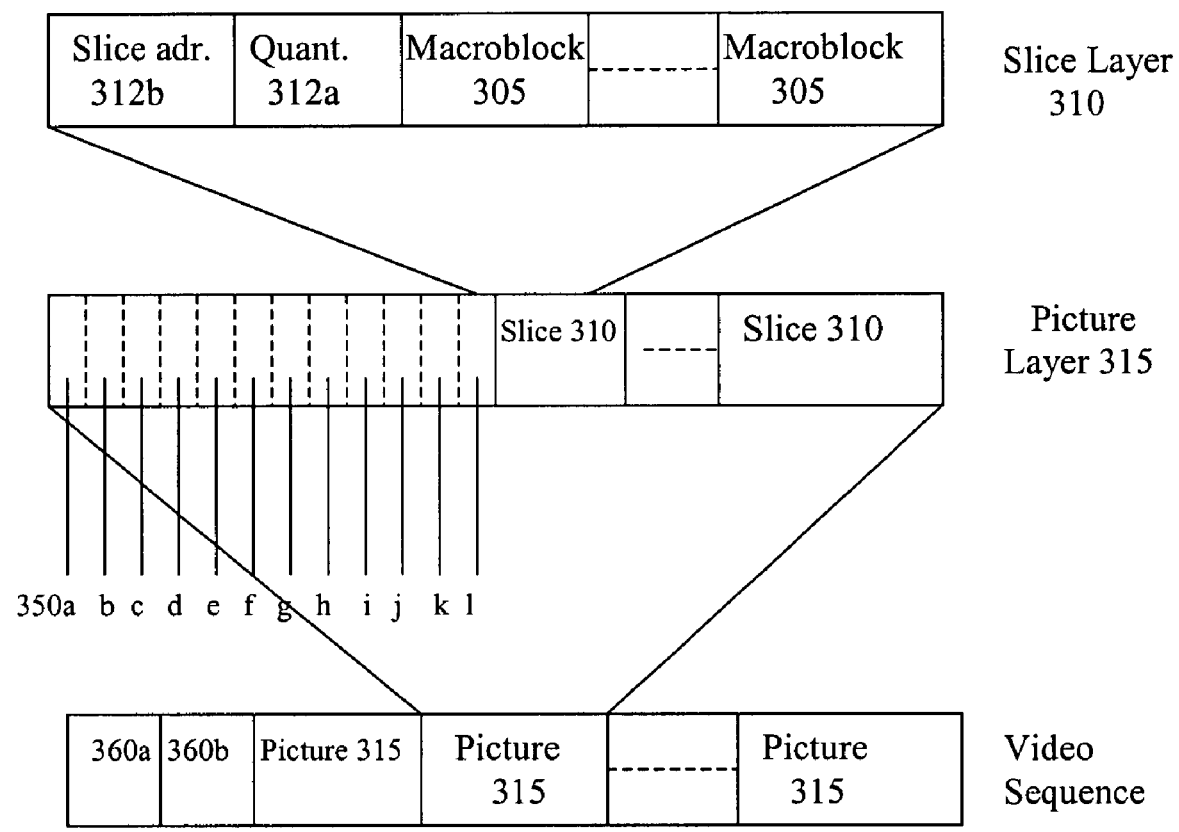
FIG. 3 is a block diagram describing an exemplary MPEG video sequence.

Referring now to FIG. 3, there is illustrated a block diagram describing an exemplary MPEG-2 video sequence. Pursuant to MPEG-2, digital frames are divided into 16×16 pixel portions represented by a data structure known as a macroblock 305. The macroblock represents encoded 16×16 pixels, taking advantage of both spatial and/or temporal redundancy.

The macroblocks of a frame are grouped into macroblock groups known as slices or slice groups. The slice is represented by a data structure known as a slice layer 310. The slice layer 310 comprises each of the macroblocks 305 grouped into the slice in addition to other parameters 312. The other parameters include quantization values 312a and an address associated with the slice 312b.

Each of the slice layers 310 associated with an image are grouped into a data structure known as a picture, or picture layer 315. The picture includes each of the slice layers 310 representing the slice groups forming the image. Additionally, the picture includes additional parameters 350. The parameters can include, for example, picture structure indicator 350a, progressive flag 350b, a presentation time stamp (PTS) present flag 350c, a progressive frame flag 350d, a picture structure indicator 350e, a PTS 350f, and pan-scan vectors 350g, aspect ratio 350h, decode and display horizontal size parameter 350i, a decode and display vertical size parameter 350j, a top field first parameter 350k, and a repeat first field parameter 350l. It is noted that in the MPEG-2 standard, additional parameters may be included. However, for purposes of clarity, some parameters are not illustrated in FIG. 3.

Other parameters are a function of the parameters. For example, the Still Picture Interpolation Mode (SPIM) is a function of the picture structure indicator 350a and the progressive flag 350b. The SPIM represents the display interpolation mode to be used for a still picture and Personal Video Recording (PVR) application such as slow motion when real time decode is turned off. The SPIM 350a controls the way a static frame picture can be displayed onto a screen, for example when user wishes to pause on a certain frame or when the encoders encode the presentation time stamps of pictures in stream in such a way that decoders are forced to display one frame repetitively. These actions can include displaying the last field, displaying the last displayed top and bottom field pair, and sending out all frames lines as both top and bottom fields. The amount of motion between two fields of a frame determines which SPIM mode gives the best visual quality.

As another example, the motion picture interpolation mode (MPIM) 350b is also function of the picture structure indicator 350a and the progressive flag 350b. The MPIM is a one-bit value used while displaying moving pictures. If the bit is set, then a complete progressive frame is output onto screen instead of breaking it into top and bottom fields. If the bit is reset, then the top or bottom field is sent depending on if the display hardware requires the top or bottom field.

The progressive frame parameter 350d indicates whether the picture has been encoded as a progressive frame. If the bit is set, the picture has been encoded as a progressive frame. If the bit is not set, the picture has been encoded as an interlaced frame.

The picture structure parameter 350e specifies the picture structure corresponding to the image buffer. Pan scan vectors 350g specify the displayable part of the picture. The aspect ratio 350h indicates the aspect ratio of the image buffer. The decode and display horizontal size parameters 350i indicate the decoded and the displayable horizontal sizes of the image buffer, respectively.

The top field first parameter 350k is a one-bit parameter that indicates for an interlaced sequence whether the top field should be displayed first or the bottom field should be displayed first. When set, the top field is displayed first, while when cleared, the bottom field is displayed first.

The repeat first field 350l is a one-bit parameter that specifies whether the first displayed field of the picture is to be redisplayed after the second field, for an interlaced sequence. For progressive sequence, the repeat first field 350l forms a two-bit binary number along with the top field first parameter 350k specifying the number of times that a progressive frame should be displayed.

The picture layers 315 representing the images of a video are grouped together in a data structure known as the sequence layer 355. The sequence layer 355 also includes additional sequence parameters 360. The sequence parameters can include, for example, a progressive sequence parameter 360a, and a frame rate parameter 360b.

It is noted that in MPEG-2 standard, additional parameters may be included. However, for purposes of clarity, some parameters are not illustrated in FIG. 3.

The progressive sequence parameter 360a is a one-bit parameter that indicates whether the video sequence 360 has only progressive pictures. If the video sequence 360 includes only progressive pictures, the progressive sequence parameter 360a is set. Otherwise, the progressive sequence parameter 360a is cleared. The frame rate 360b indicates the frame rate of the video sequence.

The video sequence 360 is then packetized into a packetized elementary stream and converted to a transport stream that is provided to a decoder.

Figure 4:
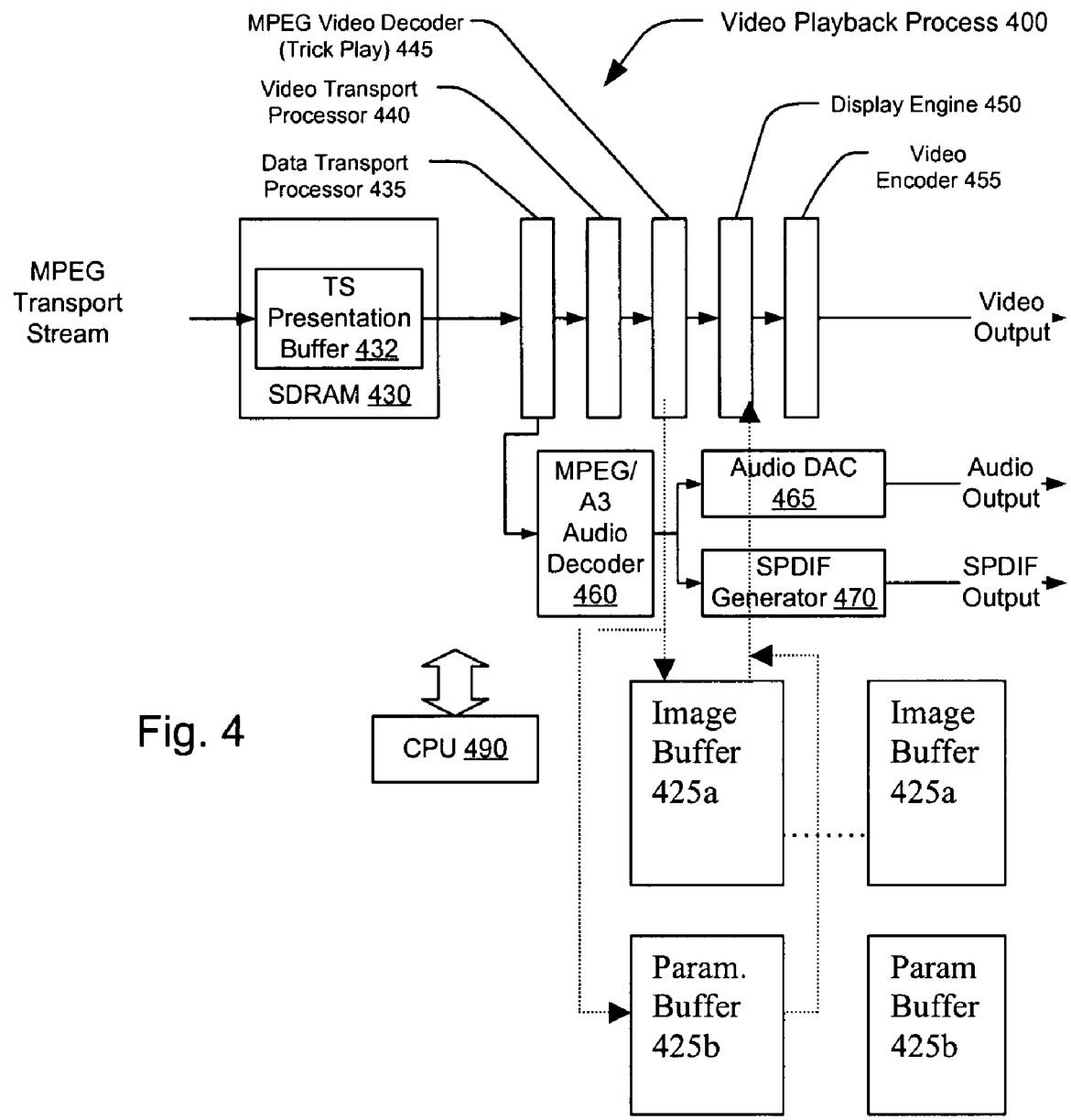
FIG. 4 is a block diagram describing an exemplary MPEG decoder configured in accordance with an embodiment of the present invention.

Referring now to FIG. 4, there is illustrated a block diagram of a decoder configured in accordance with certain aspects of the present invention. A processor, that may include a CPU 490, reads an MPEG transport stream into a transport stream buffer 432 within an SDRAM 430. The data is output from the transport stream presentation buffer 432 and is then passed to a data transport processor 435. The data transport processor then demultiplexes the MPEG transport stream into its preliminary elementary stream constituents and passes the audio transport stream to an audio decoder 460 and the video transport stream to a video transport processor 440. The video transport processor 440 converts the video transport stream into a video elementary stream and transports the video elementary stream to an MPEG video decoder 445. The video elementary stream includes encoded compressed images and parameters. The MPEG video decoder 445 decodes the video elementary stream. The MPEG video decoder 445 decodes the encoded compressed images and parameters in the video elementary stream, thereby generating decoded images containing raw pixel data.

The display engine 450 is responsible for and operable to scale the video picture, render the graphics, and construct the complete display among other functions. Once the display is ready to be presented, it is passed to a video encoder 455 where it is converted to analog video using an internal digital to analog converter (DAC). The digital audio is converted to analog in the audio digital to analog converter (DAC) 465. The display engine 450 prepares the images for display on a display screen.

The display engine 450 lags behind the MPEG video decoder 445 by a variable delay time. Because the display engine 450 lags behind the MPEG video decoder 445, the decoded images are buffered in image buffers 425a for display by the display engine 450. In order for the display engine 450 to accomplish its objective of being able to present the decoded images at their correct intended presentation time, the display engine 450 uses various parameters decoded by the MPEG video decoder 445.

The parameters can include, for example, but are not limited to, picture structure indicator 350a, progressive flag 350b, presentation time stamp (PTS) present flag 350c, progressive frame flag 350d, picture structure indicator 350e, PTS 350f, pan-scan vectors 350g, aspect ratio 350h, decode and display horizontal size parameter 350i, decode and display vertical size parameter 350j, top field first parameter 350k, repeat first field parameter 350l progressive sequence parameter 360a, or frame rate parameter 360b. The parameters can also include parameters that are function of the aforementioned parameters, such as, but not limited to still picture interpolation mode, motion picture interpolation mode.

Accordingly, the MPEG video decoder 445 stores the parameters associated with a particular image in a parameter buffer 425b associated with the image buffer 425a storing the particular decoded image. The display engine 450 retrieves the parameters needed for displaying the images on the display device and displays the images on the display device based on the parameters.

Figure 5:
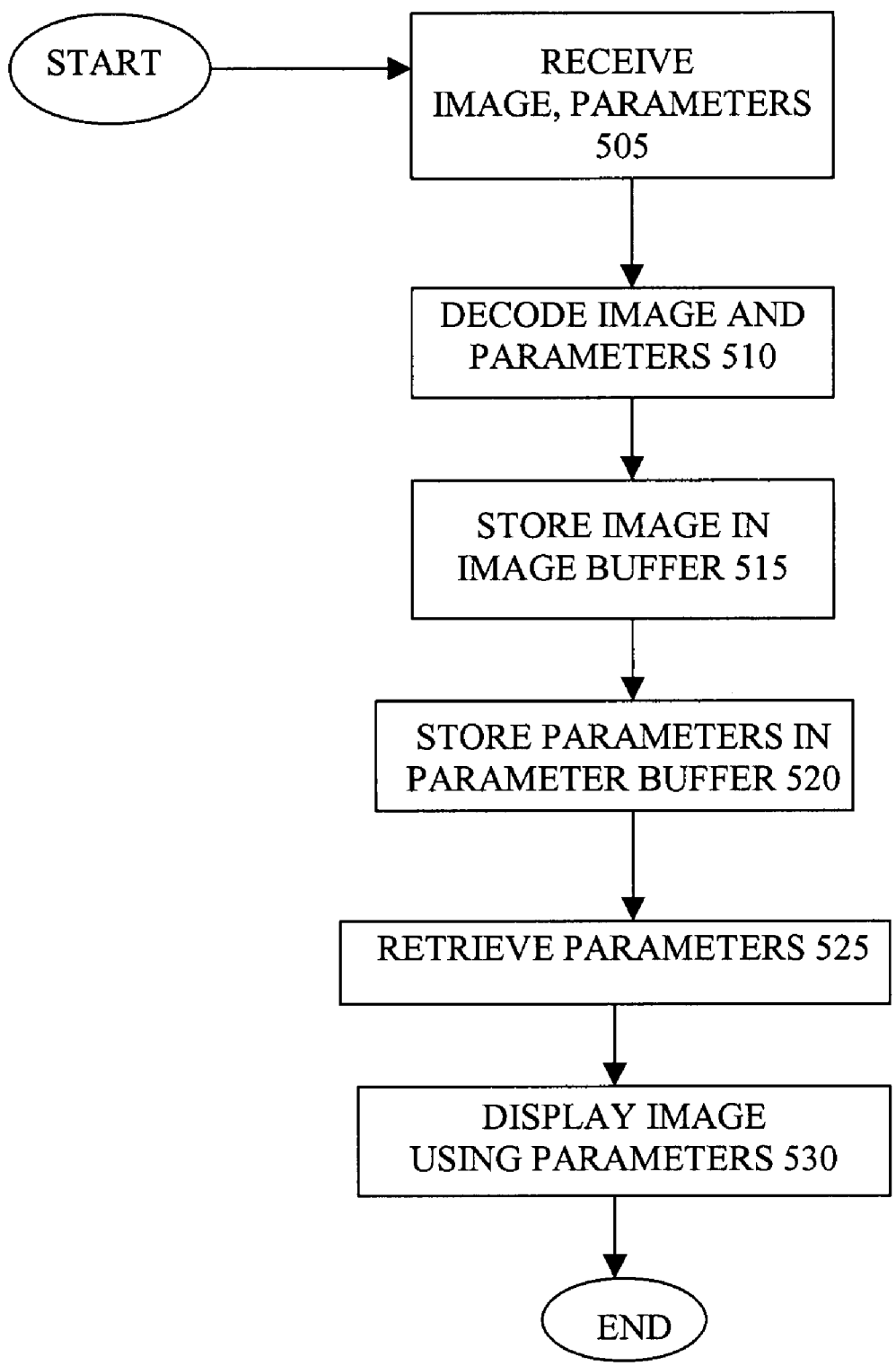
FIG. 5 is a flow diagram describing the operation of the MPEG decoder in accordance with an embodiment of the present invention.

Referring now to FIG. 5, there is illustrated a flow diagram describing the decoding and displaying of an image in accordance with an embodiment of the present invention. At 505, the MPEG video decoder 445 receives the MPEG video elementary stream comprising encoded compressed images and encoded parameters. At 510, MPEG video decoder 445 decodes the image and parameters associated therewith. The decoded image is buffered in an image buffer 425a (at 515) and the parameters are stored (at 520) in a parameter buffer 425b associated with the image buffer 425a.

The parameters can include, for example, but are not limited to, still picture interpolation mode 350a, motion picture interpolation mode 350b, presentation time stamp (PTS) present flag 350c, progressive frame flag 350d, picture structure indicator 350e, PTS 350f, pan-scan vectors 350g, aspect ratio 350h, decode and display horizontal size parameter 350i, decode and display vertical size parameter 350j, progressive sequence parameter 360a, top field first parameter 360b, repeat first field parameter 360c, or frame rate parameter 360d.

At 525, the display engine 450 retrieves the parameters stored in the parameter buffer 425b. The display engine uses the parameters retrieved during 525 to display the decoded image (530). For example, if the display engine 450 detects a change in the parameters of two successive decoded images sent out for display, the display engine 450 can initiate a display hardware reconfiguration before the decoded image with new display parameters is sent to screen.

The decoder system as described herein may be implemented as a board level product, as a single chip, application specific integrated circuit (ASIC), or with varying levels of the decoder system integrated on a single chip with other portions of the system as separate components. The degree of integration of the monitoring system will primarily be determined by speed of incoming data, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the flow charts described herein can be implemented as instructions in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment (s) disclosed, but that the invention will include all embodiments falling within the scope of the appended claims.

The invention claimed is:

1. A system for displaying images on a single display, said system comprising:
   a decoder for decoding encoded images and parameters associated with the images, thereby resulting in decoded images and decoded parameters associated with the decoded images;
   a plurality of image buffers for storing the decoded images prior to display on the single display, wherein single ones of the decoded images are displayed at a time on the single display;

a plurality of parameter buffers, wherein each of the plurality of parameters buffers corresponds to a particular one of the plurality of image buffers and is for storing the decoded parameters associated with the image stored in the corresponding one of the plurality of image buffers, prior to display on the single display, wherein single ones of the decoded images are displayed at a time on the single display; and a display engine for receiving the decoded parameters from the parameter buffers and providing the decoded images for display on the single display using the decoded parameters stored in the parameter buffers, wherein single ones of the decoded images are displayed at a time on the single display.

2. The system of claim 1, wherein the encoded images and the parameters associated with the images form portions of data packets.

3. The system of claim 2, wherein the data packets comprise headers, wherein the headers comprise the parameters.

4. The system of claim 3, wherein the headers comprise picture layer headers.

5. The system of claim 3, wherein the headers comprise sequence layer headers.

6. The system of claim 2, wherein the data packets are associated with first headers and second headers, wherein the first headers comprise a portion of the parameters, and wherein the second headers comprise another portion of the parameters.

7. The system of claim 6, wherein the first headers comprise picture layer parameters and wherein the second headers comprise sequence layer parameters.

8. The system of claim 1, wherein the encoded images comprise compressed images.

9. The system of claim 1, wherein the parameters are encoded with a variable length code, and wherein the decoder decodes the variable length code.

10. A circuit for displaying images on a display, said circuit comprising:
   a decoder;
   a plurality of image buffers connected to the decoder and configured to store images decoded by the decoder;
   a plurality of parameter buffers connected to the decoder, wherein each of the plurality of parameters buffers corresponds to a particular one of the plurality of image buffers and is and configured to store parameters associated with the image stored in the corresponding one of the plurality of image buffers;
   a display engine connected to the image buffers and the parameter buffers and configured to receive the decoded parameters from the parameter buffers and providing the decoded images for display using the decoded parameters stored in the parameter buffers, said display engine separate from the parameter buffers.

11. The circuit of claim 10, wherein the encoded images and the parameters associated with the images form portions of data packets.

12. The circuit of claim 11, wherein the data packets comprise headers, wherein the headers comprise the parameters.

13. The circuit of claim 12, wherein the headers comprise picture layer headers.

14. The circuit of claim 12, wherein the headers comprise sequence layer headers.

15. The circuit of claim 11, wherein the data packets are associated with first headers and second headers, wherein the first headers comprise a portion of the parameters, and wherein the second headers comprise another portion of the parameters.

16. The circuit of claim 15, wherein the first headers comprise picture layer parameters and wherein the second headers comprise sequence layer parameters.

17. The circuit of claim 10, wherein the parameters are encoded with a variable length code, and wherein the decoder decodes the variable length code.

18. The system of claim 1, wherein the decoded parameters include at least one parameters selected from a group consisting of presentation time stamp, top field first, and repeat first field.

19. A system for providing images for display, said system comprising:
   a decompression engine for decompressing the images and decoding parameters, thereby resulting in decompressed images;
   a first frame buffer for storing a first one of the decompressed images;
   a first parameter buffer for storing parameters associated with the first one of the decompressed images;
   a second frame buffer for storing a second one of the decompressed images;
   a second parameter buffer for storing parameters associated with the second one of the decompressed images;
   a third frame buffer for storing a third one of the decompressed images;
   a third parameter buffer for storing parameters associated with the third one of the decompressed images; and
   a display engine for providing the first decompressed image for display based on the parameters stored in the first parameter buffer, providing the second decompressed image for display based on the parameters stored in the second parameter buffer, and providing the third decompressed image for display based on the parameters stored in the third parameter buffer on a single display, one image at a time.

20. The system of claim 19, wherein the parameters associated with the first image are decoded during decompression of the first compressed image, wherein the parameters associated with the second image are decoded during decompression of the second compressed image, and wherein the parameters associated with the third image are decoded during decompression of the third compressed image.

* * * * *